(12) United States Patent
Strukov et al.

(10) Patent No.: US 8,705,265 B2
(45) Date of Patent: Apr. 22, 2014

(54) IONIC DEVICES CONTAINING A MEMBRANE BETWEEN LAYERS

(75) Inventors: Dmitri B. Strukov, Mountian View, CA (US); Alexandre M. Bratkovski, Mountian View, CA (US); R. Stanley Williams, Portola Valley, CA (US); Michael R. T. Tan, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/383,614

(22) PCT Filed: Apr. 30, 2010

(86) PCT No.: PCT/US2010/033227
§ 371 (c)(1),
(2), (4) Date: Jan. 12, 2012

(87) PCT Pub. No.: WO2011/136803
PCT Pub. Date: Nov. 3, 2011

(65) Prior Publication Data
US 2013/0033920 A1  Feb. 7, 2013

(51) Int. Cl.
*H01L 45/00* (2006.01)
*G11C 11/00* (2006.01)
(52) U.S. Cl.
USPC ................. 365/148; 257/2; 257/E45.003
(58) Field of Classification Search
USPC ............................................. 365/148
See application file for complete search history.

(56) References Cited

U.S. PATENT DOCUMENTS

| | | | |
|---|---|---|---|
| 2003/0178667 A1* | 9/2003 | Krieger et al. | 257/306 |
| 2005/0276143 A1 | 12/2005 | Busta | |
| 2006/0076549 A1 | 4/2006 | Ufert | |
| 2008/0078985 A1* | 4/2008 | Meyer et al. | 257/6 |
| 2008/0224089 A1 | 9/2008 | Pei | |
| 2009/0303772 A1* | 12/2009 | Rinerson et al. | 365/148 |

OTHER PUBLICATIONS

Andreasson, B.P. et al., "Spatial distribution of oxygen vacancies in Cr-doped SrTiO3 during an electric-field-driven insulator-to-metal transition" Applied Physics Letters, vol. 94, pp. 013513-1 to 013513-3 (2009).
Cabrera, N. et al., "Theory of the Oxidation of Metals" Rep. Progr. Phys., vol. 12, pp. 163-184 (1948).
Cummins, D. et al., "Ultrafast Electrochromic Windows Based on Redox-Chromophore Modified Nanostructured Semiconducting and Conducting Films" J. Phys. Chem. B, vol. 104, No. 48, pp. 11449-11459 (2000).
Hagfeldt, A. et al., "Fast Electrochromic Switching With Nanocrystalline Oxide Semiconductor Films" J. Electrochem. Soc., vol. 141, No. 7, pp. L82-L84 (1994).
Jameson, J.R. et al., "Field-programmable rectification in rutile TiO2 crystals" Applied Physics Letters, vol. 91, pp. 112101-1 to 112101-3 (2007).

(Continued)

*Primary Examiner* — Hoai V Ho
*Assistant Examiner* — James G Norman

(57) ABSTRACT

A device contains a first layer, a second layer; and a membrane between the first and second layers. Mobile ions are in at least one of the first and second layers, and the membrane is permeable to the ions. Interfaces of the conductive membrane with the first layer and the second layer are such that charge of a polarity of the ions collects at the interfaces.

14 Claims, 4 Drawing Sheets

(56) References Cited

OTHER PUBLICATIONS

Strukov, D. et al., "Coupled Ionic and Electronic Transport Model of Thin-Film Semiconductor Memristive Behavior" Small, No. X, pp. 1-6 (2009).

Strukov, D. et al., "Exponential ionic drift: fast switching and low volatility of thin-film memristors" Applied Physics A, vol. 94, pp. 515-519 (2009).

Strukov, D. et al., "The Missing Memristor Found" Nature, vol. 453, pp. 80-83 (2008).

Waser, R. et al., "Redox-based Resistive Switching Memories—Nanoionic Mechanisms, Prospects, and Challenges" Advanced Materials, vol. 21, pp. 2632-2663 (2009).

Yan, M.F. et al., "Effects of Cation Contaminants in Conductive $TiO_2$ Ceramics" Journal of Applied Physics, vol. 53, No. 12, pp. 8809-8818 (1982).

Yang, J.J. et al., "Memristive Switching Mechanism for Metal/oxide/metal Nanodevices" Nature Nanotechnology, vol. 3, pp. 429-433 (2008).

Waser, R. et al., "Nanoionics-based Resistive Switching Memories" Nature Materials, vol. 6, pp. 833-840 (2007).

* cited by examiner

US 8,705,265 B2

IONIC DEVICES CONTAINING A MEMBRANE BETWEEN LAYERS

BACKGROUND

Recently developed ionic devices rely on the movement of ions in ionic conductors to change electrical or other properties of the devices. For example, FIG. 1A shows an ionic device 100, which includes a layer or film 120 of an ionic conductor that is sandwiched between two electrodes 110 and 130. Ionic conductor 120 may be a layer of titanium dioxide ($TiO_2$), while ions 125 are oxygen vacancies, i.e., gaps in the crystal structure where oxygen is missing. With titanium dioxide and oxygen vacancies, ionic device 100 can behave as a memristor because a voltage difference applied between electrodes 110 and 130 can drive ion currents that move oxygen vacancies and significantly alter the electrical resistance ionic conductor 120. For a display device, ionic conductor 120 can be a layer of tungsten trioxide ($WO_3$), while ions 125 are lithium ions which are sufficiently mobile in tungsten trioxide to move in response to an applied voltage. Pure tungsten trioxide is clear, but lithium impurities give tungsten trioxide a blue color. Accordingly, ion currents that move lithium ions to or from a display surface can change the color of the surface of ionic device 100.

FIG. 1A shows a configuration of device 100 in which ions 125 are concentrated near one electrode 110. Layer 120 may initially be fabricated in this configuration by forming two layers 122 and 124 with distinct compositions, e.g., one layer 122 containing a primary material such as titanium dioxide $TiO_2$ and the other layer 124 containing a source material such as oxygen-depleted titanium dioxide The source material is the initial source of the mobile ions. Application of a voltage having the proper polarity and sufficient magnitude between electrodes 110 and 130 can then drive, an ion current that moves ions 125 from layer 122 into layer 124 to switch device 100 from the state shown in FIG. 1A in which ions are concentrated near electrode 110 to the state shown in FIG. 1B in which more ions 125 are dispersed throughout ionic conductor 120. The distribution of ions 125 in FIG. 1B can, for example, convert an insulating layer 122 of pure titanium dioxide to a semiconductor layer resulting when titanium dioxide is doped with oxygen vacancies. Continued application of a high voltage of the same polarity can switch device 100 to the state of FIG. 1C where the ions are highly concentrated near electrode 120. Device 100 can similarly switch back from the state of FIG. 1B or 1C to the state of FIG. 1A by application of an opposite polarity voltage of sufficient magnitude to drive an ion current that moves ions 125 toward electrode 110. Switching between the states of FIGS. 1A and 1B is particularly useful for ionic memristive devices, while switching between the states of FIGS. 1A and 1C may be useful for ionic display devices. These operations are possible because ionic conductor 120 provides sufficient mobility for movement of ions 125 of a species that is capable of significantly altering the properties of ionic conductor 120 or device 100 as a whole.

Non-volatile operation of ionic devices such as device 100 is often desired. For example, for use as a non-volatile memristive memory cell, device 100 might have a high voltage applied with a polarity selected to switch device 100 to the high resistance state corresponding to FIG. 1A or 1C or a low resistance state corresponding to FIG. 1B in order to write a binary value 0 or 1 to device 100. A lower voltage that causes an electron current but minimal ion movement can then be used to detect or measure the resistance of device 100 and read the value previously written. However, higher mobilities of ions in ionic conductor 120, which are desirable for fast switching, permit movement of ions when a read voltage is applied for a read operation and even when no external voltage is applied. Typically, an ionic device has only one stable ionic concentration profile (e.g., uniformly distributed ions as in FIG. 1B) corresponding to the thermodynamic equilibrium and an ionic device tends to relax, e.g. by diffusion, toward the stable concentration profile. The rate at which an ionic device will, relax can be significant. For example, drift-diffusion, which controls the relaxation time, may be just V times slower than the ion current during switching, where V is the applied switching voltage in units of thermal voltage $V_T = k_B T/e$ where $k_B$ is the Boltzmann constant, e is the electron charge and T is the temperature. For typical voltages used for the thin film ionic devices, the ratio of relaxation time to switching time may only be a few thousands, so that fast switching devices may have poor non-volatile retention. In many applications, both fast switching and long retention times are desired.

BRIEF DESCRIPTION OF THE DRAWINGS

Use of the same reference symbols in different figures indicates, similar or identical items.

DETAILED DESCRIPTION

In accordance with an aspect of the invention, an ionic device includes a layer of an ionic conductor doped with impurities that are charged or have an affinity for charge of a polarity opposite to the polarity of the active ions used in the ionic device. Charge associated with the impurities or dopants cause a mirror charge at interfaces with other materials such as electrodes or conductive membranes, and the mirror charge repels the active ions from the interfaces creating an "ionic bottle" that helps contain the ions. In one embodiment, a compartmented ionic device has a first ionic bottle in a layer of ionic conductor between a first electrode and an ion-permeable membrane and a second ionic bottle in a layer of ionic, conductor between the ion-permeable membrane and a second electrode. The compartmenting of the ionic device in this manner improves the stability of states of the device, particularly states where the active ions are concentrated in one of the ionic bottles.

Figure 1A:
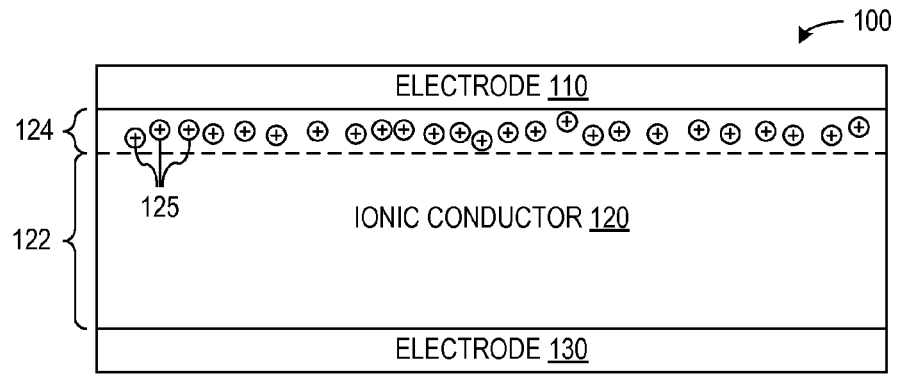
FIGS. 1A, 1B, and 1C are cross-sectional views of a known ionic device in different ion distribution states.
Figure 1B:
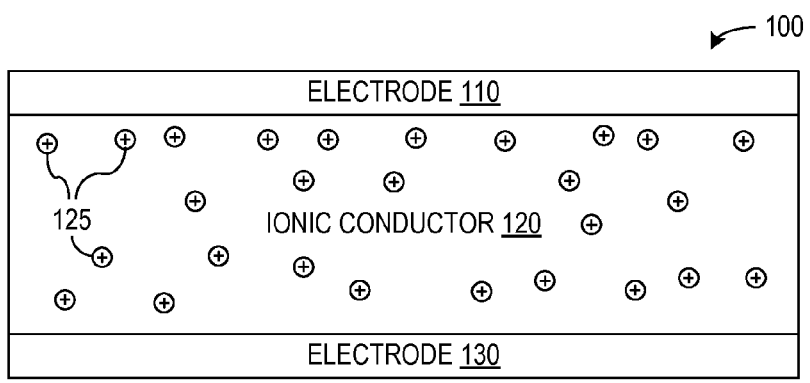
Figure 1C:
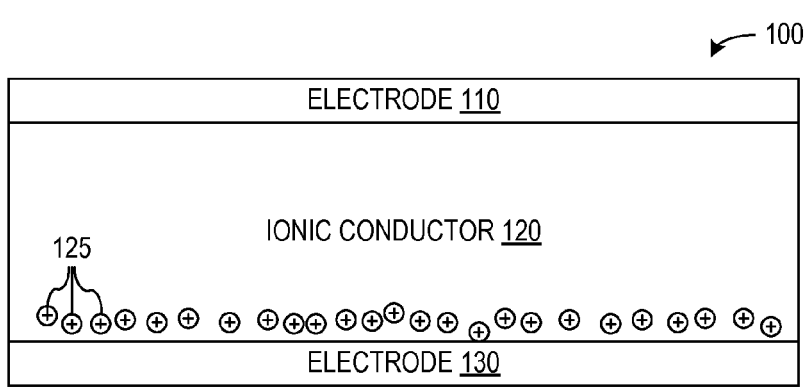
Figure 2:
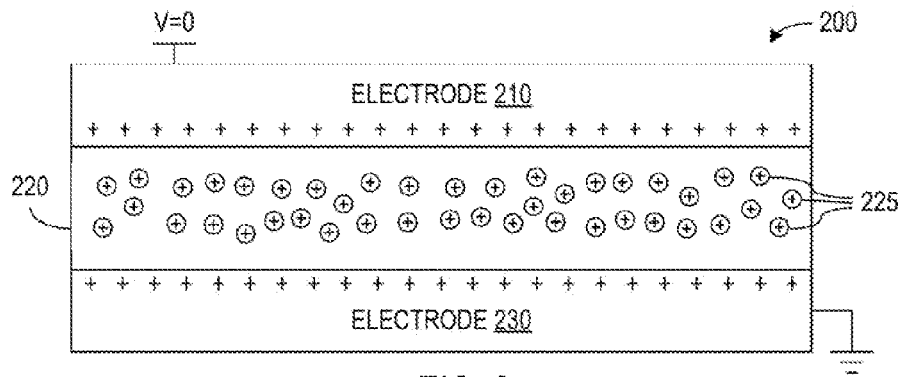
FIG. 2 is a cross-sectional view of an ionic device in accordance with an embodiment of the invention employing the ionic bottle effect.

FIG. 2 illustrates a multilayer ionic device 200 including an ionic-electronic semiconductor layer 220 between two electron-conductive electrodes 210 and 230. Layer 220 contains ions 225 that are mobile in layer 220 and have a first charge polarity, e.g., positive in FIG. 2. For example, layer 220 could be a material such as titanium dioxide ($TiO_2$) containing mobile oxygen vacancies as ions 225 for a memristive ionic device, or layer 220 could be a material such as tungsten trioxide ($WO_3$) containing mobile lithium ions as ions 225 for an ionic display device. In general, ions 225 need to be kept inside layer 220 even if the concentration of the ion species outside layer 220 is negligible. This is particularly a concern when electrode 210 or 230 is an ionic conductor. Ion confinement can be enhanced if the bulk Fermi energy of layer 220 is lower than that of the electrodes by a value U, where U is the electrostatic potential difference given in units of thermal voltage $V_T$ defined above. (The value U is usually shown for electron bands as the difference in the bottom of the conduction band, which is −e*U, e being the magnitude of elementary charge of an electron.) The desired difference in the Fermi energies can be achieved by additional doping of semiconductor layer 220 with acceptor or donor impurities depending on the polarity of ions 225 or can alternatively be due to intrinsic alignment in the heterostructure. In a heterostructure, the conduction bands usually offset by the difference in the workfunction of two dissimilar materials plus a modified interface dipole layer that is strongly influenced by interface trapping states. In either case, formation of the contact or interface of electrodes 210 and 230 with layer 220 results in electrons transferred to or from layer 220, leaving electrodes 210 and 220 charged. In the illustrated embodiment, electrodes 210 and 230 are positively charged and thus push positively charged mobile ions 225 towards the middle of layer 220, so that the ion concentration profile of layer 220 in equilibrium resembles an upside down U-shape. Alternatively, if mobile ions 225 are negative charged, layer 220 can be doped with donor impurities to have a bulk Fermi energy larger than that of electrodes 210 and 230, causing electrodes 210 and 230 to be negatively charged due to contact with layer 220.

Figure 3:
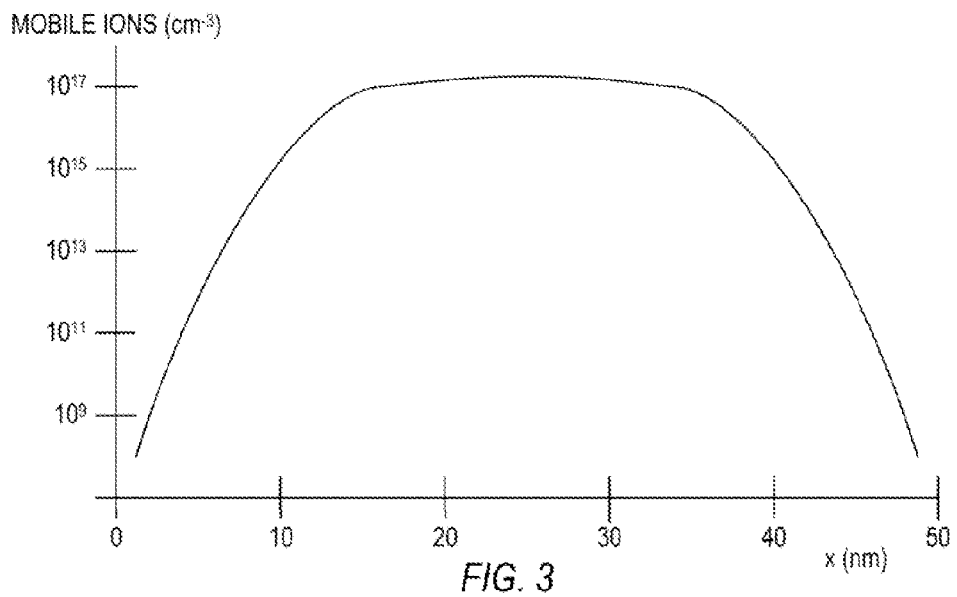
FIG. 3 is a plot illustrating an equilibrium distribution of ions in an ion bottle in accordance with an embodiment of the invention.

FIG. 3 roughly illustrates an ion distribution of ions 225 corresponding to a steady state solution of the Boltzmann Poisson equations assuming Fermi-Dirac statistics for electron distribution inside layer 220. For the distribution of FIG. 2, layer 220 is a layer of rutile ($TiO_2$) that is about 50 nm thick and starts with a uniform concentration of $2 \times 10^{17}$ $cm^{-3}$ of oxygen vacancies for ions 225 while the background doping is $3 \times 10^{18}$ $cm^3$ of an acceptor such as carbon or silicon. Over time with no applied voltage to electrodes 210 and 230, the uniform distribution of oxygen vacancies relaxes toward the illustrated distribution. For the solution of FIG. 3, energy levels of the donors and acceptors are assumed to be equal to the bottom of the conduction band of electrodes 210 and 230 and the top of the valence band of layer 220, respectively. As can be seen from the distribution of FIG. 3, the induced charge on electrodes 210 and 230 keeps, ions 225 away from electrodes 210 and 230, so that loss of ions at electrodes 210 and 230 is minimized.

Figure 4A:
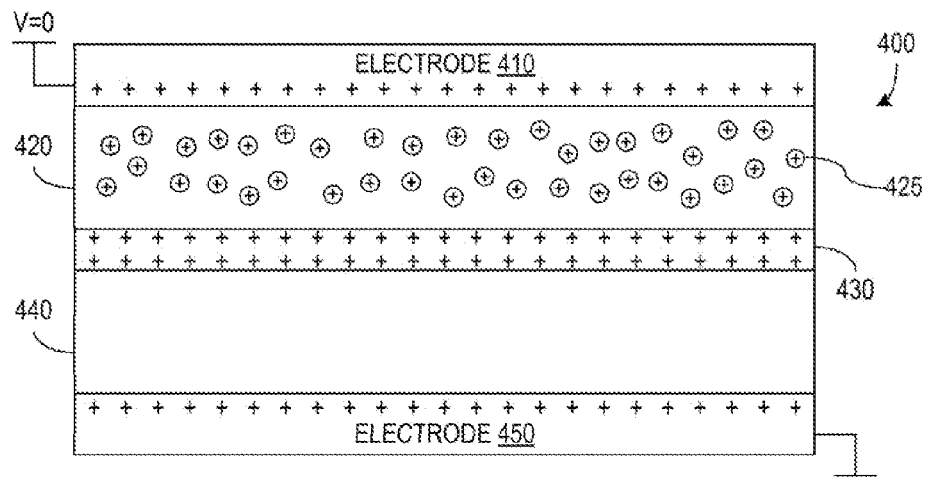
FIGS. 4A, 4B, 4C, and 4D show different states of an ionic device in accordance with an embodiment of the invention employing the ionic bottle effect in two layers of ionic conductor separated by an ion-permeable barrier.

FIG. 4A shows a compartmented ionic device 400, which is based on the "ionic bottle" effect illustrated in FIG. 3. Device 400 includes a top electrode 410, a first layer 420 of ionic-electronic semiconductor, a metallic membrane 430 that is permeable to the active ions used in device 400, a second layer 440 of ionic-electronic semiconductor, and a bottom electrode 450. Outer electrodes 410 and 450 are, in some embodiments, preferably made of a conductive, ion-blocking material such as platinum, which is relatively non-reactive and effectively blocks escape of active ions such as oxygen vacancies or lithium ions. Membrane 430 can be a layer of a conductive material such as aluminum that is a few nanometers thick (e.g., 2 or 3 nm thick), so that membrane 430 permits movement of ions such as oxygen ions or lithium ions between layers 420 and 440.

The compositions of layers 420 and 440 in general depend on the function of ionic device 400. In an exemplary memristive embodiment of ionic device 400, layers 420 and 440 are primarily titanium dioxide. Layers 420 and 440 can be doped differently with mobile ions 425 (e.g., oxygen vacancies) and immobile acceptors (e.g., silicon atoms.) In the device state of FIG. 4A, active ions 425 are initially within layer 420 and absent from layer 440. Device 400 can be fabricated in the state of FIG. 4A using conventional integrated circuit fabrication techniques such as sputtering or vapor deposition to deposit layers 410, 420, 430, 440, and 450 on a substrate (not shown). In particular, the chemical composition used in deposition of layer 420 can include the primary material of layer 420 along with in situ doping and ions 425, but ions 425 being mobile can begin in either layer 420 or 440. In one specific configuration, layer 420 is titanium dioxide and is heavily acceptor doped with uniform concentration NA1, e.g., about $10^{19}$ to $10^{20}$ acceptor atoms per $cm^{-3}$, which is much larger than the concentration of mobile ions, e.g., an initial concentration of about $2 \times 10^{17}$ oxygen vacancies $cm^{-3}$. As a result, electrical resistance of layer 420 remains largely unchanged regardless of the movement of ions 425. The thickness of layer 420 is not critical but may be between a few nanometers to hundreds of nanometers and may be between 30 and 50 nm thick for symmetry with layer 440 in a typical embodiment.

Layer 440 is primarily the same material as layer 420 and is also heavily doped with acceptor impurities. However, the acceptor concentration NA2 in layer 440 is such that a significant presence of mobile ions 425 (say half of the total number of mobile ions 425) in layer 440 significantly shifts the electronic band and changes the resistance of layer 440. For example, the acceptor concentration may be about $10^{17}$ $cm^{-3}$ in layer 440 when moving about half of the mobile ions from layer 420 into layer 440 when the initial concentration of mobile ions in layer 420 is about $2 \times 10^{17}$ $cm^{-3}$. The thickness of layer 440 in this embodiment is important to the switching speed of device 400, and layer 440 may be a few nanometers to hundreds of nanometers thick and preferably is particularly may be between about 30 and 50 nm thick for switching times on the order of one hundred nanoseconds at reasonable applied voltages.

Figure 4B:
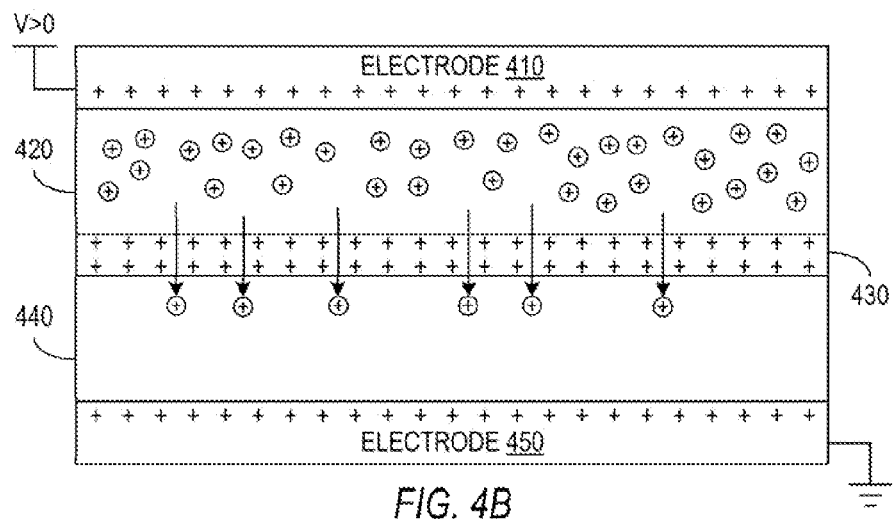
Figure 4C:
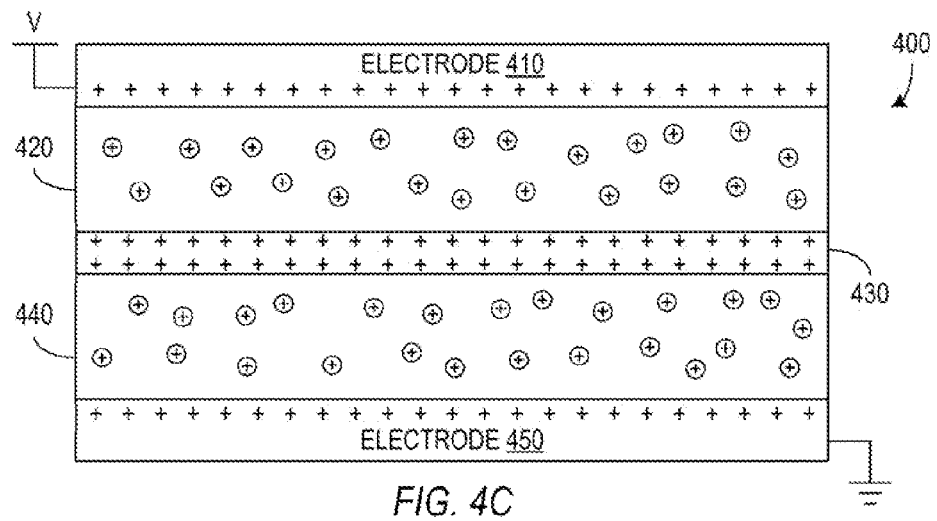
Figure 4D:
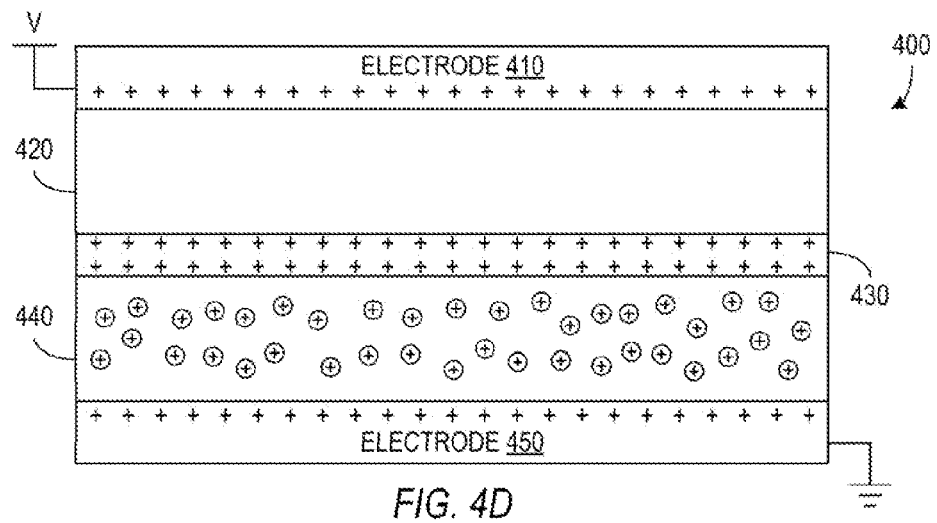
Figure 5:
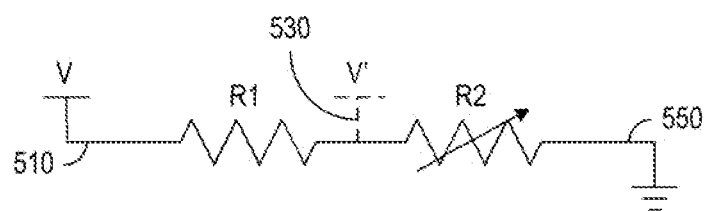
FIG. 5 is an effective circuit diagram of the device of FIGS. 4A, 4B, 4C, and 4D.

FIG. 5 shows an effective circuit diagram of device 400 in the exemplary memristive embodiment. In this embodiment, layer 420 has a resistance R1 that is nearly constant, and layer 440 has a resistance R2 that varies with the concentration of ions 425 in layer 445. FIG. 4A corresponds to a high resistance state where resistance R2 is large as a result of the low concentration of ions in layer 440. Applying a positive voltage difference between electrode 410 and 420 (i.e., terminals 510 and 550) that is sufficient to overcome the built-in voltage at the interface of layer 420 with membrane 430 will drive some ions 425 from layer 420 through membrane 430 into layer 440 as shown in FIG. 4B. If the positive voltage is maintained for a suitable length of time, the state of ionic device 400 will switch from the state of FIG. 4A where most of active ions 425 are in layer 420 to the state where a significant percentage of ions 425 are in layer 440 as shown in FIG. 4C or most of ions 425 are in layer 440 as shown in FIG. 4D. In either case, the resistance R2 of layer 420 in the state of FIG. 4C or 4D can be dramatically less than the resistance R2 in the state of FIG. 4A. Accordingly, ionic device 400 can be used, for example, as a memristor or a memristive memory cell. Further, since each layer 420 or 440 with its adjacent conductive layers 410 and 430 or 430 and 450 employs an ionic bottle effect, device 400 has excellent retention of any of its states, including the states illustrated in FIGS. 4A, 4C, and 4D.

FIG. 5 also illustrates that device 400 could optionally include a third terminal 530 coupled to membrane 430 in addition to terminals 510 and 550 respectively associated with electrodes 410 and 420. The third terminal 530 can be used, for example, for direct sensing of resistance R2 in a memristive memory cell. With such a configuration, movement of ions 425 can be avoided using terminals 530 and 550 during a read operation of a memristive, memory cell, while terminals 410 and 450 are used during a write operation to the memristive memory cell. Alternatively, in a two-terminal configuration, i.e., not using terminal 530, membrane 430 is galvanically connected via resistance R1 to electrode 410 and terminal 510. When a read voltage is applied across electrode 410 and 450, there is a voltage drop across layer 420. However, a difference in acceptor doping between layers 420 and 440 can make resistance R1 much smaller than resistance R2, so that resistance R1 does not significantly affect the ratio of on and off resistances of device 400. On the other hand, there is no such limitation on resistance R1 or the acceptor doping of layer 420 for the three-terminal configuration where terminal 530 is used to bypass resistance R1 during a read operation.

Another exemplary embodiment of device 400 is as a display device. In the exemplary display embodiment, layers 420 and 440 can be a material such as tungsten trioxide ($WO_3$) and ions 245 can be lithium ions. In this case, the resistances of layers 420 and 440 are not critical, so that layers 420 and 440 may be acceptor doped to the same concentration, e.g., $10^{17}$ to $10^{18}$ $cm^3$ of niobium in tungsten trioxide, and the dopant concentration may be chosen to maximize the ionic bottle effect in both layers 420 and 440. For a display device, at least one electrode 410 or 430 can be made of a transparent conductive material such as indium tin oxide. Assuming electrode 410 is the transparent electrode at the display surface of this embodiment of device 400, the state of FIG. 4A, where the concentration of active ions 425 (e.g., lithium ions) is high in layer 420 (e.g., in tungsten trioxide), the top layer 420 will have a characteristic color (e.g., blue) of layer 420 with a high concentration of ions 425. In contrast, the state of FIG. 4D where the concentration of active ions 425 (e.g., lithium ions) is low in layer 420 (e.g., in tungsten trioxide), display layer 420 will have a characteristic color (e.g., clear) of layer 420 with a low concentration of ions 425. The ionic bottle effects as described above help retain the ion concentrations in respective layers 420 and 440, so that the display color of device 400 can be better retained when no power is applied, e.g., when the applied voltage V is zero.

The operation of an ionic display device can also be based on changing the resistance of a layer near a display surface to thereby change the reflectance of the layer. Such display devices can be similar or identical to the memristive devices described herein but may be designed to move higher concentrations of ions in order to provide greater reflectivity contrast. Two-terminal devices may provide lower cost and higher device density for displays, but three-terminal devices could be alternatively be used, particularly for e-paper applications which do not have strict density requirement and could accommodate more wires.

Ions 245 in memristive and display embodiments of device 400 will generally redistribute between layers 420 and 440 at a rate that depends on the difference in concentrations on opposite sides of membrane 430 and on the applied voltage that pushes ions 245 through membrane 430. When no voltage is applied, the ion concentrations at membrane 430 are low, causing the drift of ions 245 across membrane 430 to be low. Application of bias voltage V exponentially changes the concentration near the interface and hence causes much faster redistribution of ions in either direction depending on the polarity of the bias voltage V. Near room temperature (300° K), the ratio of the drift rate for an applied voltage of 1 to 2 volts to the drift rate with no applied voltage can be as high as $10^9$ to $10^{17}$. The high ratio provides excellent retention even for a device having a high switching speed.

Device 400 is described above for embodiments using some examples of materials for ionic conductor layers and active ions. However, many other combinations of ions and ionic conductor materials might be employed in ionic devices that perform similar functions to those described above or that use ionic currents for different purposes. For example, some other material-ion combinations that can be used for memristive devices include $ZrO_{2x}$, $HfO_2$, $VO_2$, $SrTiO_{3x}$, or $GaN/GaN_{1-x}$ with oxygen vacancies, CuCl with chlorine vacancies, and GaN with sulfur ions. For a display device, amorphous silicon with silver ions or $TiO_2$ with sodium, lithium, or hydrogen ions may be employed.

The parameters of device 400 can also be adjusted to provide operation with desirable power and speed performance for specific material combinations. For example, to suppress the concentration of mobile ions 425 at an interface with membrane 430, relatively large, e.g., of the order of 1 eV, band bending (or built-in voltage) is desired. For such a gap, the depletion width on the interface should be smaller than or comparable to the device linear size, i.e., the thickness of the ion conductor layer. For the system with background acceptor doping, the thickness L and doping concentration NA of each layer 420 or 440 can be chosen using Equation 1, where $\in$, $\in_0$, $k_B$, U, T, and e are respectively the dielectric constant of the material, the dielectric constant of a vacuum, the Boltzmann constant, built-in electrostatic potential offset at the interfaces, device temperature, and the electron charge. Alternatively, the acceptor concentration NA can be equal to $N_D \exp[\Delta Ugap]$ where $N_D$ is the effective density of states at the appropriate edge of the band and $\Delta Ugap$ is a band gap of the semiconductor if no background doping is required to achieve sufficient band bending at the interface. For example, for thickness L=10 nm, acceptor doping NA of the order $5 \times 10^{18}$ $cm^{-3}$ may be needed (if $\in$=10). An additional constraint related to the built-in voltage at the interface might be the necessity to keep the electric field on the interface small to avoid dielectric breakdown effects.

$$L \approx (\in \in_0 U k_B T/NA)^{1/2}/e \qquad \text{Equation 1}$$

The switching speed of device 400 involves three processes for ionic redistribution when a bias voltage is applied, namely establishing a new ion concentration on the interface by piling up ions 245 with electric field in one layer 420 or 440, diffusion of these ions through membrane 430, and redistribution of ions in the second layer 440 or 420. Neglecting time associated with first and the last of these processes, the switching speed of device 400 is roughly $L^2/D$, where L and D are respectively the thickness of membrane 430 and the diffusion constant. The switching time will decrease with the thickness of membrane 430. For example, for a few-nanometer membrane and $D=10^{-5}$ $cm^2/s$ the switching time could be less than 100 ns. Long retention and fast switching speed may be combined with small switching energy and small switching currents because transport through membrane 430 is slow without an applied electric field and is very fast in the electric field created by an applied voltage.

The devices described above can combine high speed less than 100 ns, low power less than 1 fJ/bit, and a retention to switching speed ratio greater than $10^{15}$. Moreover, the device operation is based on linear mode for the ionic drift, which at the same time allows for high endurance. Operation of the devices could be achieved with nanocrystalline or amorphous materials and therefore are potentially compatible with back-end processes enabling cost efficient multilevel integration.

Although the invention has been described with reference to particular embodiments, the description is, only an example of the invention's application and should not be taken as a limitation. For example, although the above embodiments employ specific materials and charge polarities, other materials and opposite charge polarities could be similarly employed in other embodiments of the invention. Various other adaptations and combinations of features of the embodiments disclosed are within the scope of the invention as defined by the following claims.

What is claimed is:

1. An ionic device comprising:
   a first layer;
   a first terminal coupled to the first layer;
   a second layer;
   a second terminal coupled to the second layer;
   ions in at least one of the first layer and the second layer, wherein the ions are mobile in the first layer and the second layer;
   a membrane between the first layer and the second layers, wherein the membrane is permeable to the ions, and the membrane has interfaces with the first layer and the second layer are such that charge having a polarity of the ions collects at the interfaces; and
   a third terminal coupled to the membrane layer.

2. The device of claim 1, wherein the first layer contains impurities that create an affinity in the first layer for charge of a polarity opposite to the polarity of the ions.

3. The device of claim 2, wherein the second layer contains impurities that create an affinity in the second layer for charge of the polarity opposite the polarity of the ions.

4. The device of claim 3, wherein a concentration of the impurities in the first layer differs from a concentration of the impurities in the second layer.

5. The device of claim 1, wherein the second layer has a resistance that changes in response to movement of the ions through the membrane.

6. The device of claim 5, wherein the first layer has a resistance that changes less in response to movement of the ions through the membrane than does the resistance of the second layer.

7. The device of claim 1, wherein the first layer has a color that changes in response to movement of the ions through the membrane.

8. The device of claim 1, wherein:
   the first layer contains an ionic-electronic semiconductor;
   the second layer contains an ionic-electronic semiconductor; and
   the membrane contains a metal.

9. The device of claim 1, wherein a voltage applied between the first terminal and the second terminal drives a current of the ions through the membrane.

10. The device of claim 1, wherein a voltage applied between the third terminal and the second terminal produces a current through the second layer without driving the ions through the membrane.

11. A method for operating a device comprising:
    establishing a first state of the device wherein ions are primarily distributed in a first layer that is separated from a second layer by an intervening conductive membrane;
    applying a voltage difference between a first terminal that is coupled to the first layer and a second terminal that is coupled to the second layer, wherein the applied voltage causes an ionic current that moves a quantity of the ions through the conductive membrane into the second layer and changes a resistance of the second layer; and
    sensing the resistance of the second layer using the second terminal and a third terminal coupled to the conductive membrane.

12. The method of claim 11, wherein:
    a first interface of the first layer with the conductive membrane that is such that charge of the same polarity as the ions collects at the first interface when no external voltage is applied; and
    a second interface of the second layer with the conductive membrane is such that charge of the same polarity as the ions collects at the second interface when no external voltage is applied.

13. The method of claim 12, wherein the first layer is doped with acceptor impurities that increase an affinity of the first layer for charge of a polarity opposite to the charge of the ions.

14. The method of claim 11, wherein:
    the device is a memristive memory cell;
    applying the voltage to the first terminal and the second terminal changes the resistance of the second layer to write a data value to the memristive memory cell; and
    sensing the resistance using the second terminal and the third terminal reads the data value.

* * * * *